United States Patent
Segev et al.

(10) Patent No.: US 12,474,841 B1
(45) Date of Patent: Nov. 18, 2025

(54) PIPELINE OPTIMIZATION IN LOW POWER MODE USING PMR

(71) Applicant: Sandisk Technologies, Inc., Milpitas, CA (US)

(72) Inventors: Amir Segev, Meiter (IL); Amir Rozen, Rishon Lezion (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/817,040

(22) Filed: Aug. 27, 2024

(51) Int. Cl.
  *G06F 3/06* (2006.01)
(52) U.S. Cl.
  CPC .......... *G06F 3/0613* (2013.01); *G06F 3/0634* (2013.01); *G06F 3/0659* (2013.01); *G06F 3/0673* (2013.01)
(58) Field of Classification Search
  CPC .... G06F 3/0613; G06F 3/0634; G06F 3/0659; G06F 3/0673
  See application file for complete search history.

(56) References Cited

U.S. PATENT DOCUMENTS

| | | |
|---|---|---|
| 10,296,249 B2 | 5/2019 | Benisty |
| 11,016,669 B2 | 5/2021 | Bains et al. |
| 11,537,193 B2 | 12/2022 | Segev et al. |
| 2021/0389885 A1 | 12/2021 | Richter et al. |
| 2023/0236740 A1 | 7/2023 | Kwon |

*Primary Examiner* — Eric Cardwell
(74) *Attorney, Agent, or Firm* — Patterson + Sheridan, LLP

(57) ABSTRACT

When entering low power mode, any commands that are fetched and waiting to be executed are completed. When the data storage device exits low power mode, new commands are fetched. The completing and fetching takes time. Rather than completing all of the commands, some selected commands can be stored in a persistent memory region (PMR) when entering low power mode. The storing in PMR is faster than completing the commands. Furthermore, retrieving the commands from PMR is faster than retrieving new commands from a host device on exiting low power mode. Thus, using PMR results in more efficient use of data storage device bandwidth.

20 Claims, 8 Drawing Sheets

PIPELINE OPTIMIZATION IN LOW POWER MODE USING PMR

BACKGROUND OF THE DISCLOSURE

Field of the Disclosure

Embodiments of the present disclosure generally relate to utilizing a persistent memory region (PMR) for optimized pipeline usage during power up and power down.

Description of the Related Art

Data storage devices are power consumers in a data storage system and often, the data storage system might put the data storage device into low-power mode to save power, or for cooling down due to over-heating. The data storage system will take the wake-up and turn-off times into consideration when the data storage system decides to initiate the low-power process.

One of the defined power states is the deep sleep mode. In deep sleep mode, only a very small power consumption is allowed for the data storage device. The very small amount of power is used to allow fast recovery into full power mode without having to go through the entire, long boot-up process. The part of the controller that is responsible for the fast recovery and small amount of power usage is called Always-On (AON) since AON is physically implemented and located in the always-on domain (i.e., no power shut off).

When going into low power mode, part of the data storage device (i.e., the non-AON) is turned off. As such, to not lose information, before turning off the power, the data storage device needs to "clean" the pipes, so that the data storage device will wake in a known state. Cleaning the pipes involves a combination of completing the commands in execution, failing commands, and flushing data, all of which lead to the turn-off time mentioned above. Upon power up, the pipes are again filled with new commands which leads to the wake-up time mentioned above.

There is a need in the art for improving efficiencies during power up and power down.

SUMMARY OF THE DISCLOSURE

When entering low power mode, any commands that are fetched and waiting to be executed are completed. When the data storage device exits low power mode, new commands are fetched. The completing and fetching takes time. Rather than completing all of the commands, some selected commands can be stored in a persistent memory region (PMR) when entering low power mode. The storing in PMR is faster than completing the commands. Furthermore, retrieving the commands from PMR is faster than retrieving new commands from a host device on exiting low power mode. Thus, using PMR results in more efficient use of data storage device bandwidth.

In one embodiment, a data storage device comprises: a memory device, and a controller coupled to the memory device, wherein the controller is configured to: stop fetching commands from a host device; turn off a link to the host device; selectively copy pre-fetched commands from an arrival queue; store the selectively copied pre-fetched commands in a persistent memory region (PMR), wherein there are two different types of commands, wherein one type of command of the two different types of commands are the pre-fetched commands that are stored in PMR, and wherein a second type of command of the two different types of commands are fetched commands that will not be stored in PMR; determine whether the arrival queue is empty; wait for a data path engine to be idle; and turn off power to the memory device.

In another embodiment, a data storage device comprises: a memory device; and a controller coupled to the memory device, wherein the controller is configured to: determine whether a persistent memory region (PMR) has any stored commands; start fetching commands from the PMR; reduce a counter for each fetched command; and re-establish a link with a host device, wherein the re-establishing occurs after the determining, wherein there are two different types of commands, wherein one type of command of the two different types of commands are the pre-fetched commands that are stored in PMR, and wherein a second type of command of the two different types of commands are fetched commands that will not be stored in PMR.

In another embodiment, a data storage device comprises: means to store data; and a controller coupled to the means to store data, wherein the controller is configured to: allocate a first portion of persistent memory region (PMR) to a host device and a second portion of the PMR for storing pre-fetched commands, wherein the second portion is invisible to the host device; store selectively pre-fetched commands in the second portion of the PMR during a power down, wherein there are two different types of commands, wherein one type of command of the two different types of commands are the pre-fetched commands that are stored in PMR, and wherein a second type of command of the two different types of commands are fetched commands that will not be stored in PMR; and retrieve the selectively pre-fetched commands from the second portion of the PMR during a power up.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

When entering low power mode, any commands that are fetched and waiting to be executed are completed. When the data storage device exits low power mode, new commands are fetched. The completing and fetching takes time. Rather than completing all of the commands, some selected commands can be stored in a persistent memory region (PMR) when entering low power mode. The storing in PMR is faster than completing the commands. Furthermore, retrieving the commands from PMR is faster than retrieving new commands from a host device on exiting low power mode. Thus, using PMR results in more efficient use of data storage device bandwidth.

Figure 1:
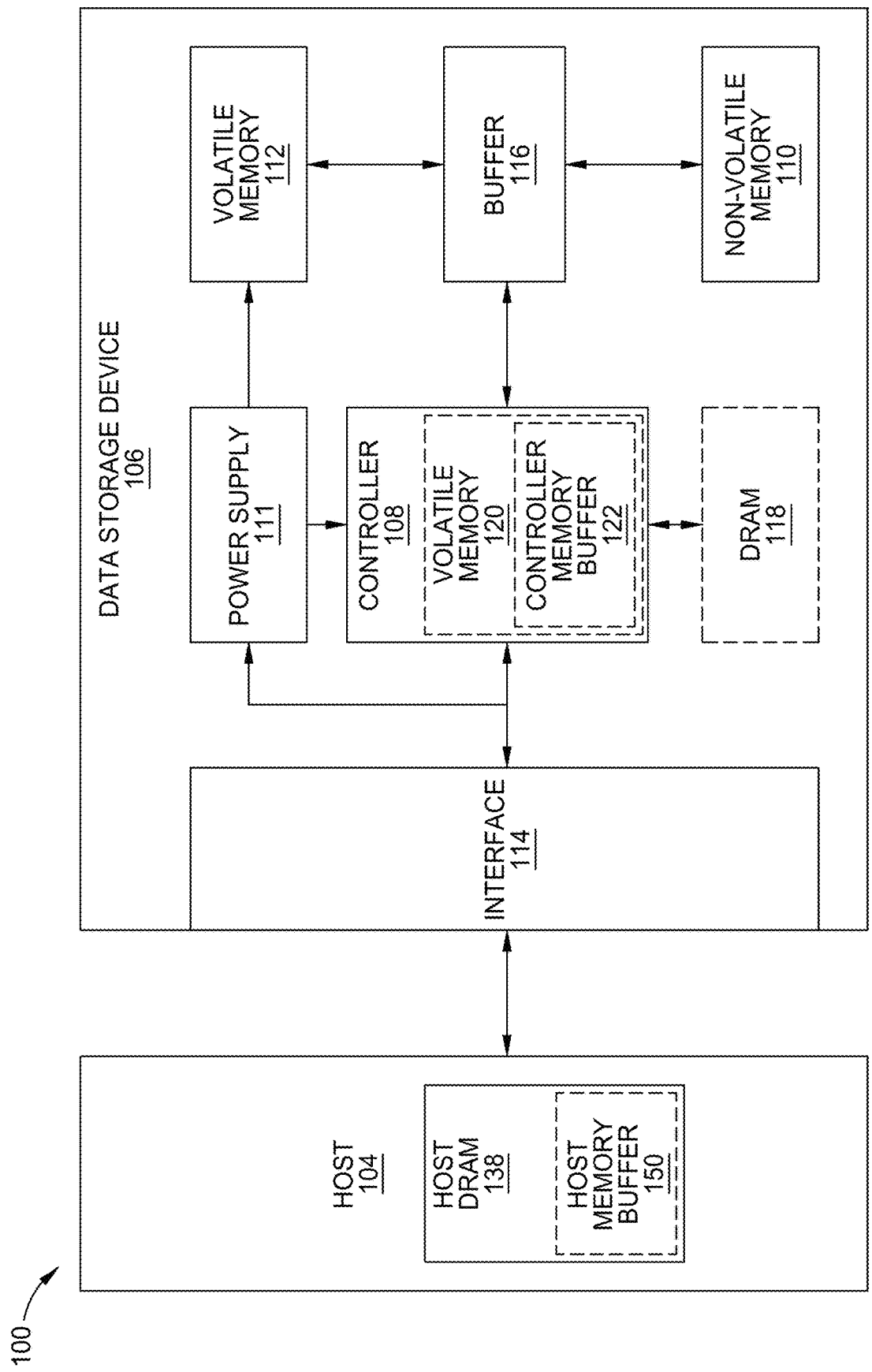
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. It is contemplated that the volatile memory 112 and the DRAM 118 may, in some embodiments, be one in the same. However, it is contemplated that the volatile memory 112 and the DRAM 118 may in fact be different volatile memories with the DRAM 118 being a specific type of volatile memory. As will be discussed below, a second volatile memory 120, which may be SRAM, could also be one in the same with the write buffer 116. However, it is contemplated that there could be distinct DRAM, SRAM, and write buffer. In other words, it is contemplated that there may be multiple distinct volatile memories. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), Compute Express Link (CXL), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
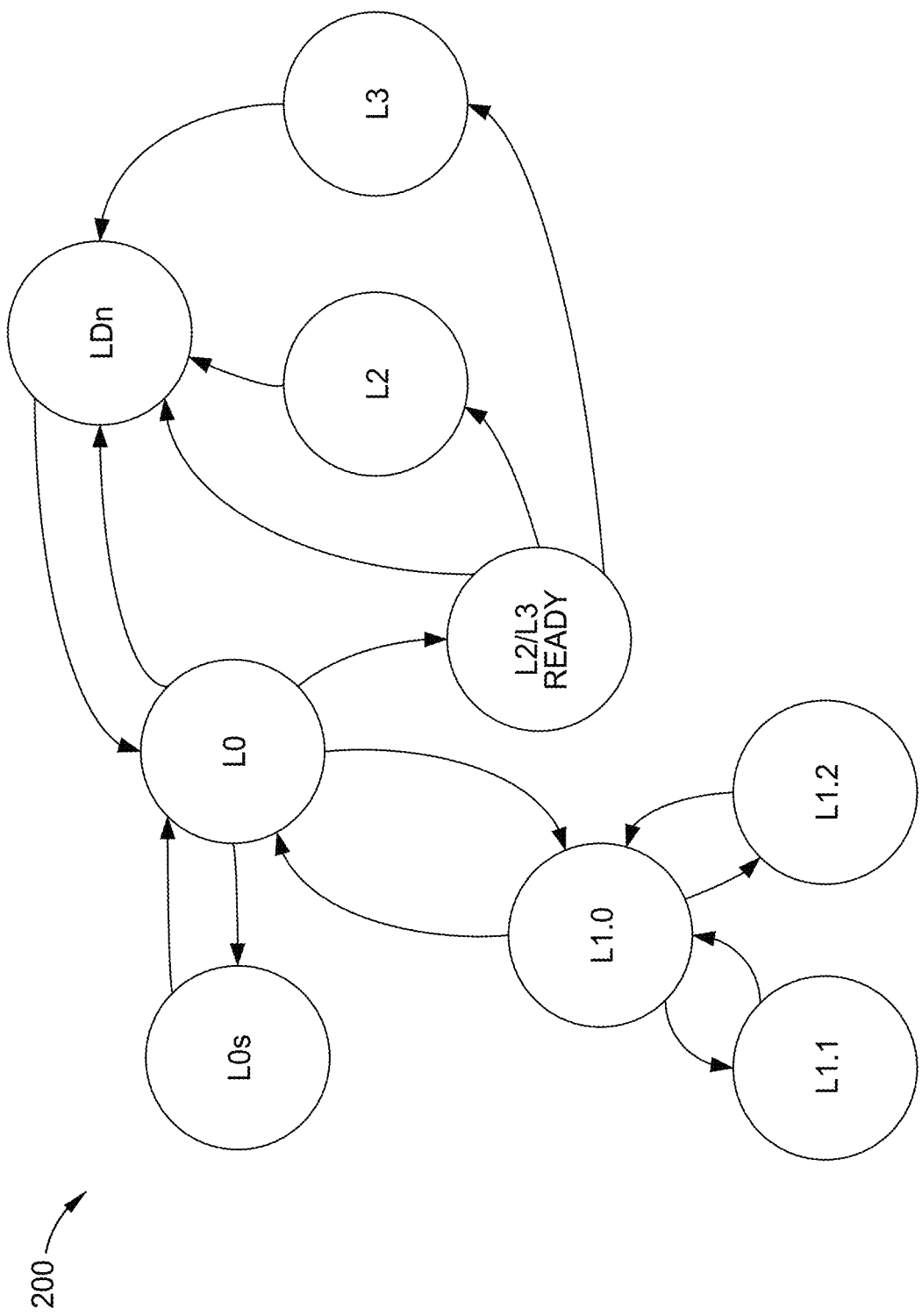
FIG. 2 is an illustration of a link state flow diagram, according to certain embodiments.

FIG. 2 is an illustration of a link state flow diagram 200, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state. Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 200 may be available and more or less low power link states may be applicable to the embodiments described herein.

Link states are numbered sequentially, where higher numbers represent lower power requirements due to a greater number of offline circuits and corresponding higher exit latencies. The relevant link states are L0, L0s, L1, and L1.2. L2 and L3 are functionally identical except that Vaux is available in L2. Both have main power rails disabled and the controller 108 is fully powered off (except for whatever may be powered by Vaux). Client solid state devices (SSDs) (which use aggressive link power management) do not support Vaux, so L3 is the same as L2. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, L0s and L1 may have a lower functionality than that of L0. For example, L0s has a similar power requirement as that of the L0, but only allows for a serial link in one direction. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that auxiliary power has not been yet removed from the L2 link state. Furthermore, the memory devices of the NVM 110 that are not used are placed in a non-operational link state, L2 and L3, to limit the idle power consumption to a minimal value.

In order for 1/O commands to occur, the link, such as a data bus, between the host device 104 and the controller 108 is woken up and placed into the L0 link state. The most common state for idle is L1.2. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104).

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1SS, the link remains operational and requires less power to return to a more operational state, such as L1.0 or L0. Furthermore, the L1SS requires less time than the L2 and/or the L3 link states to return to a full active link state L0. It is to be understood that "link state" may be referred to as "power state" herein for exemplary purposes.

Figure 3:
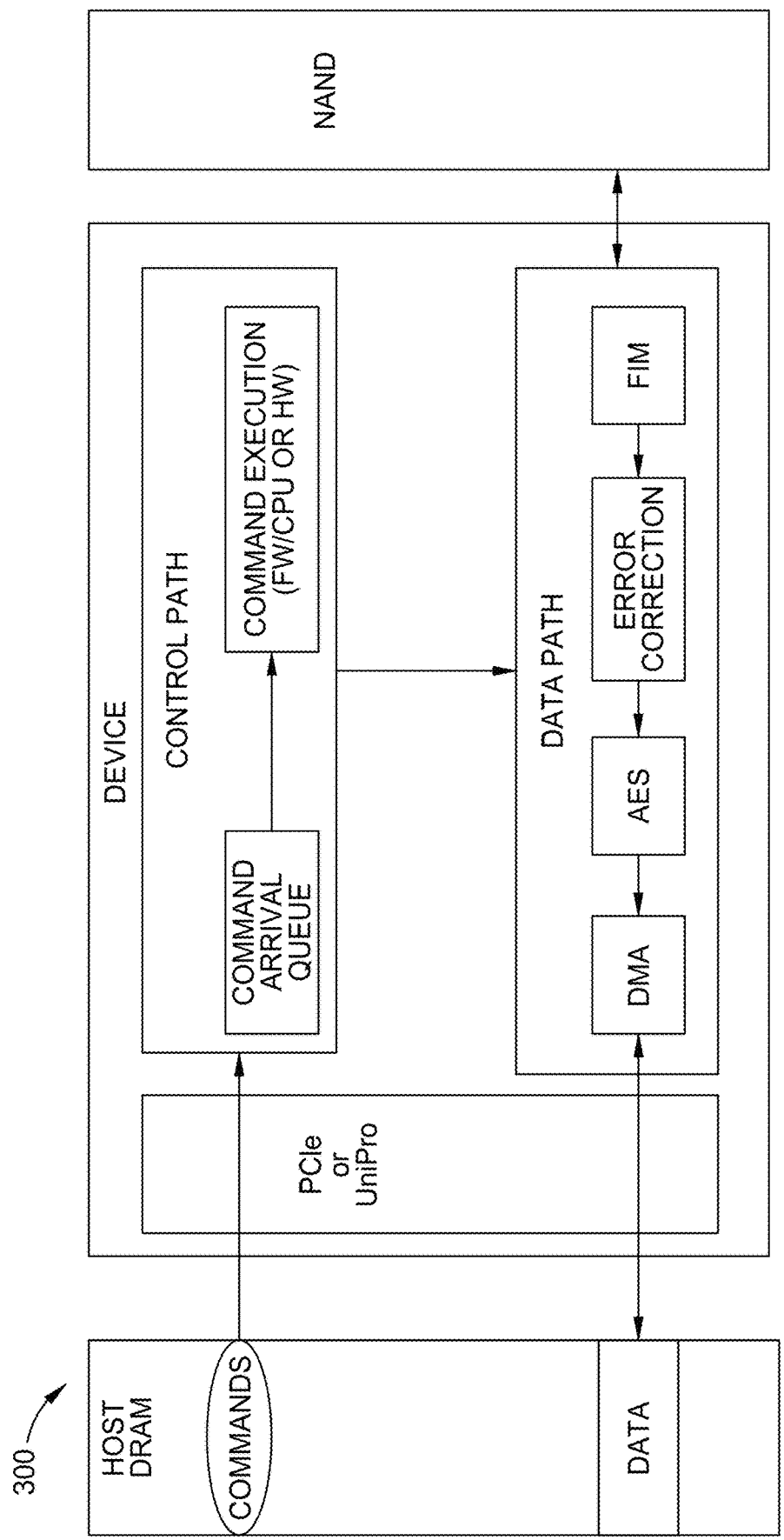
FIG. 3 is a schematic illustration of SSD pipe stages according to one embodiment.

FIG. 3 is a schematic illustration of SSD pipe stages according to one embodiment. The system 300 includes a host device having a host DRAM where the host places commands and instructs the data storage device to place data. The data storage device has a controller that is coupled to the host device and a memory device (e.g., NAND). There is a bus or interface between the controller and the host device. The bus is exemplified to be a PCIe or UniPro bus. The controller has a control path and a data path. The control path includes a command arrival queue into which commands from the host device are placed after passing through the bus. The command execution module is coupled to the command arrival queue and is where the commands from the command arrival queue begin execution. The command execution module may comprise firmware (FW) a CPU, or hardware (HW). Upon beginning execution, the commands travel the data path through a direct memory access (DMA) module, an encryption module (e.g., AES), an error correction module, and a flash interface module (FIM).

Consider the path of a single read command. The command arrives at the command arrival queue. The command then reaches the command execution module. The command execution module triggers the data path HW engines: FIM to read data from the memory device (e.g., NAND), error correction, AES decryption, and DMA to write the data to the host device in the host DRAM. To meet performance expectations, multiple commands are held in the command arrival queue to make sure that all the pipeline stages are always busy.

Any command that was fetched and resides in the command arrival queue, and any command that is being worked on by the command execution module or the data-path engines needs to complete before power off else the data will be lost. The commands that have been fetched or are being worked on is referred to as residue throughout the disclosure. Considering a power up situation, after the data storage device establishes the link with the host device, the pipeline begins to fill with new commands.

Figure 4:
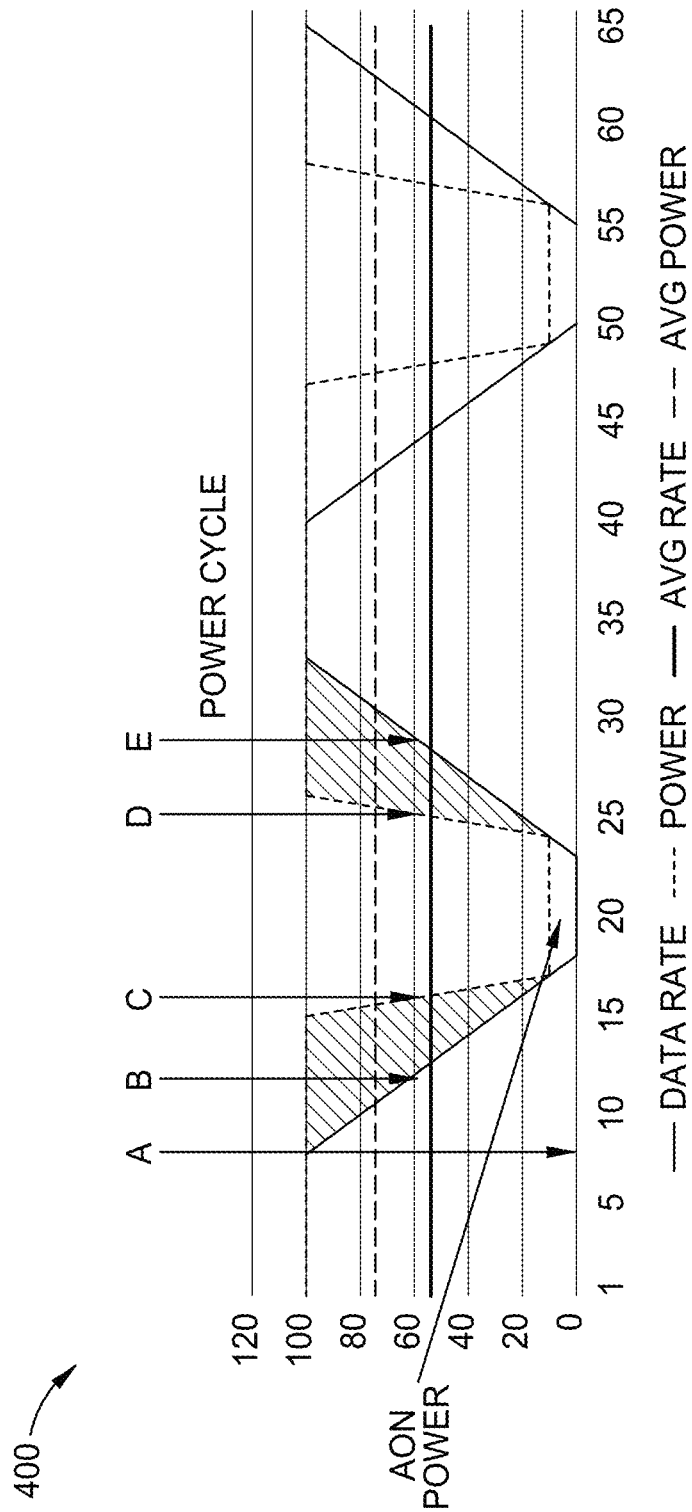
FIG. 4 is a graph illustrating a power cycle according to one embodiment.

FIG. 4 is a graph 400 illustrating a power cycle according to one embodiment. In FIG. 4, there are several notations to consider. A is for the time which the system requests the controller to go into low power mode. B is the data rate slope, and the data rate slope lowers as time passes until there are no residues and power can be stopped. C is the slope of power drop, which occurs after all data transfer related residues are completed. D is the slope of power rising and occurs before data can be transferred from the host device. E is the slope of data rate and occurs until the full data rate is reached again.

The way current data transfer is stopped, is done by stopping further fetches from the host device. Already fetched commands are finished, until all internal buffers are clear, and there is no residue. Only then will the data storage device move to deep sleep mode, but the "residue issue" has already occurred and impacted performance. The residue issue is shown in FIG. 4 by the triangular area between B and C and between D and E. The triangular area between B and C is time and power wasted during a power down scenario. Similarly, the triangularly area between D and E is time and power wasted during a power up scenario. During B, power cannot be turned off due to residues. E does not utilize the bus even though the power is on because the pipeline is empty.

The longer it takes to enter and exit (i.e., return to full performance) the low-power mode, the less likely the data storage system or host device is to initiate the low-power mode, since there will be a large waste of bandwidth. The instant disclosure discusses improving the residue cleanup, and the pipeline filling phases, and hence the slope of the power transitions.

The suggested solution disclosed herein is composed of two main parts. The first part is to utilize the PMR HW flow by allocating a small dedicated non-host device range of the PMR. The range is used for storing previously fetched commands. The previously fetched commands will not be executed during power down residue cleaning. However, the previously fetched commands will be used during power-up in parallel to the PCIe-link being re-established to fill in the pipelines. There is an advantage in doing so because HW capability to fetch commands from PMR already exists for normal PMR use cases. The second part is to selectively select which commands to leave in the residue.

Thus, the disclosure discusses selectively choosing which commands (or parts of commands) to store in PMR and which to leave in the residue. The disclosure also discusses executing the PMR stored commands upon waking up. The disclosure also discusses preparing the physical addresses for the PMR stored commands before entering a low-power state to ensure that the physical address is available upon waking up, thus eliminating the need to wait for the L2P table to fully recover.

PMR is different from AON memory as PMR is part of the data path, allowing for automation. Using AON involves manual activation of the data path for those commands. PMR, however, is part of the data path and can utilize the data path automatically as part of the main flow.

Figure 5:
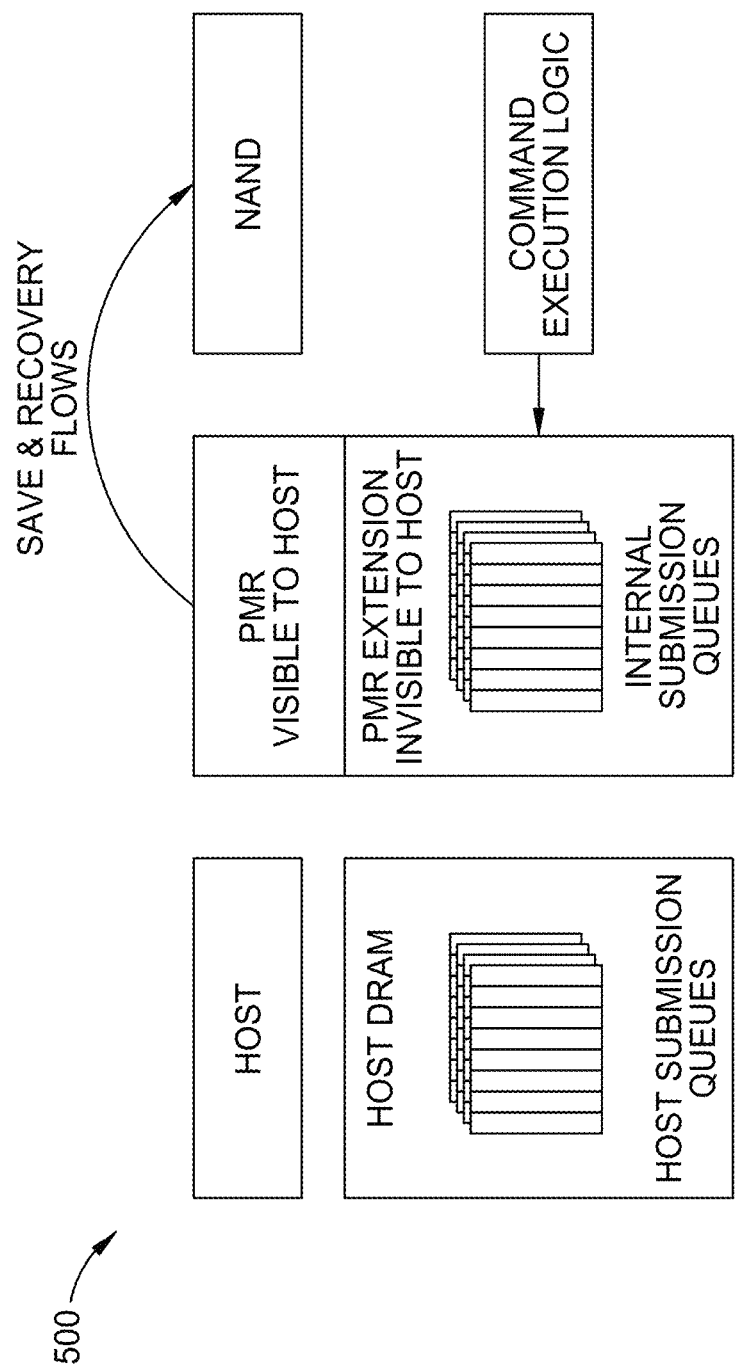
FIG. 5 is a schematic illustration of leveraging PMR logic for low power modes according to one embodiment.

FIG. 5 is a schematic illustration 500 of leveraging PMR logic for low power modes according to one embodiment. The high level diagram shows a host device having a host DRAM where there are a plurality of host submission queues. The PMR has two portions. The first portion is the typical PMR portions and is visible to the host device. The second portion of the PMR is the new portion called the PMR extension and is invisible to the host device. The PMR extension contains internal submission queues that the command execution logic or module will use for placing selected pre-fetched commands during power down. The first portion will be used for save and recovery flows along with the memory device (e.g., NAND).

Figure 6:
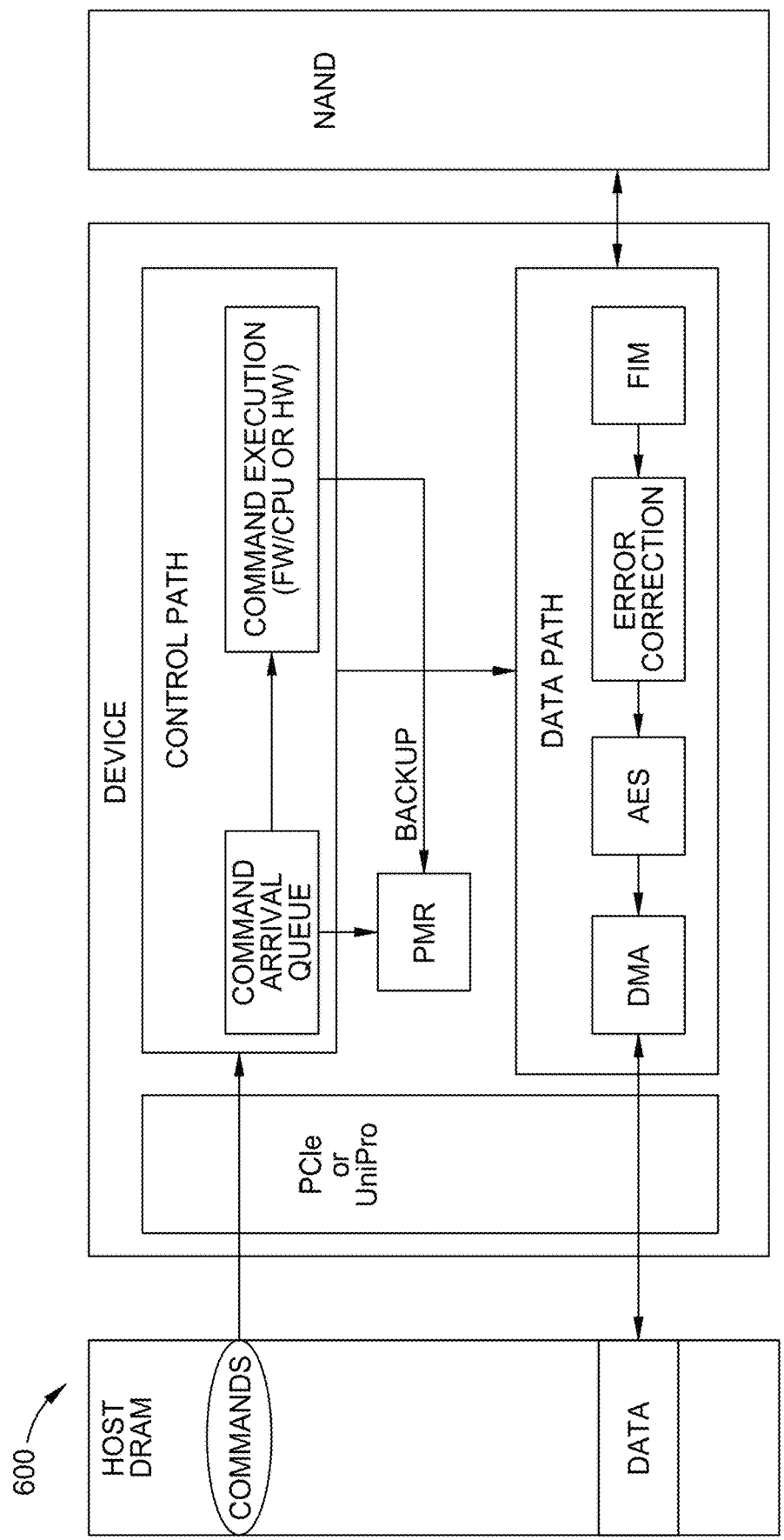
FIG. 6 is a schematic illustration of a system having PMR according to one embodiment.

FIG. 6 is a schematic illustration of a system 600 having PMR according to one embodiment. The system 600 is similar to system 300 from FIG. 3, except that a PMR is present and is coupled to both the command arrival queue and the command execution module in the control path. More specifically, FIG. 6 shows the system 600 with the PMR, which is used in the flows. PMR is a memory range used by the host device and data storage device to store information that is persistence through power-cycles. PMR might reside in local DRAM or an SRAM depending on the size of the PMR. The device controller reads the commands from the host device. When there is a PMR, the host device might use the PMR space (i.e., the first portion of the PMR) to generate host device submission queues. As such, command fetching should have a connection to the PMR memory as shown by the arrow between the PMR and the command arrival queue.

However, in the instant disclosure, another arrow is added, which is marked as "backup". The idea here is that during power-down, the data storage device will copy one or more commands that were already fetched from the host device, into the PMR, instead of executing the commands during power down. Then, during power-up, in parallel to the link being established between the hots device and the data storage device, the command arrival queue will fetch the commands from the PMR and start to execute the commands that were stored in the second portion of the PMR. By the time the link is ready, the pipe stages will be full, and data transfer can start immediately.

Figure 7:
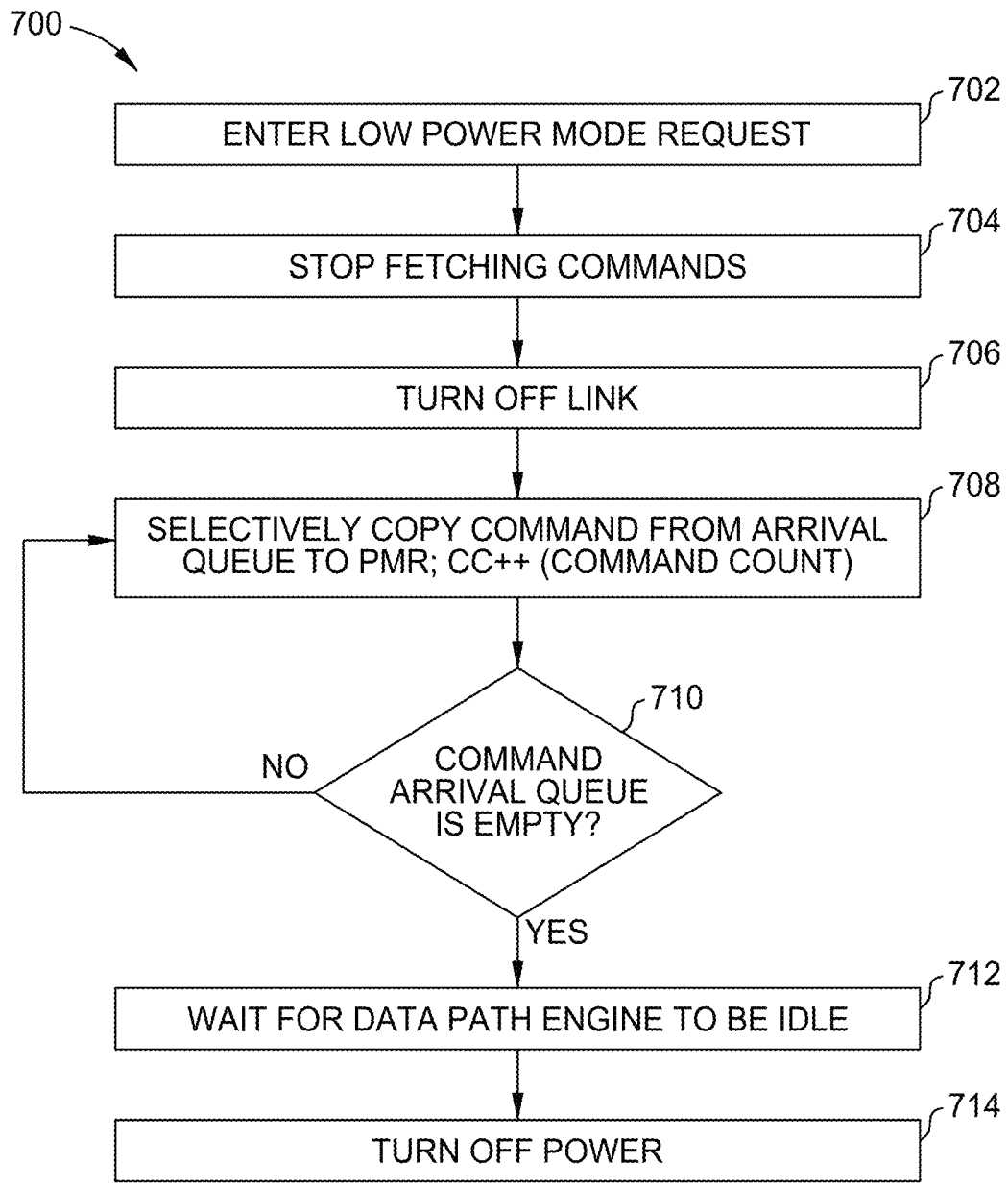
FIG. 7 is a flowchart illustrating entering low power mode according to one embodiment.

FIG. 7 is a flowchart 700 illustrating entering low power mode according to one embodiment. Initially, there is a request to enter lo power mode at block 702. Due to the request, command fetching stops at block 704 and the link between the host device and the data storage device is turned off at block 706. At this point, it is time to begin selectively copying commands and storing those selectively copied commands in PMR. Non-selected commands will be residue and continue through the pipeline until completion with one caveat. Some commands can be partially executed so that a portion of the command is residue, but a new, smaller command is stored in PMR.

The selective portion begins at block 708 by selecting which commands that are in an arrival queue should be selected and stored in PMR. Any time a command is selected, a counter is increased. The arrival queue is checked to determine whether the queue is empty at block 710. The queue may have commands that will be selected, but haven't been selected as of yet. Also, the queue may have commands that will not be selected, but will be residue to be completed prior to power down. After the arrival queue is empty at block 710, the controller needs to wait for the data path engine to be idle at block 712 due to residue clean up, and then the power may be turned off at block 714.

When exiting low power mode, the pipeline is empty. It takes time to fill the pipelines with commands from the host device, but commands do need to be fetched. If the command is a read command, access the L2P table will occur and then the read command can be issued to the HW engines.

So ultimately, there are some commands kept in PMR. The commands that are kept in PMR are selected commands that will help fill the pipe. In particular, not needing to consult the L2P table is valuable in this situation because the L2P table is stored in the memory device (e.g., NAND) and it takes some time to recover the L2P table. Thus, during the selecting, the physical addresses are provided to the selected commands and stored in PMR with the selected commands. Using PMR over any AON device is valuable because the PMR is a part of the flow. A submission queue may be placed in the second portion of the PMR so that the submission queue is a part of the flow. Nothing special need be done when using PMR as opposed to some random always on retention table memory or power retention enabled memory. Such memories do not help the automation flow to recover because FW has to do a lot of work to put those command into motion from such memories, because those memories are not part of the flow path.

For the selected commands, the commands can be short and not require PRP. Such commands do not contain attributes such as an overlap part of a stream, errors, partial FMUs, etc. that will not fill the pipes. Short commands that span a single page are ok because short command processing involves less intervention and the FW should be busy with booting up everything and setting up.

Figure 8:
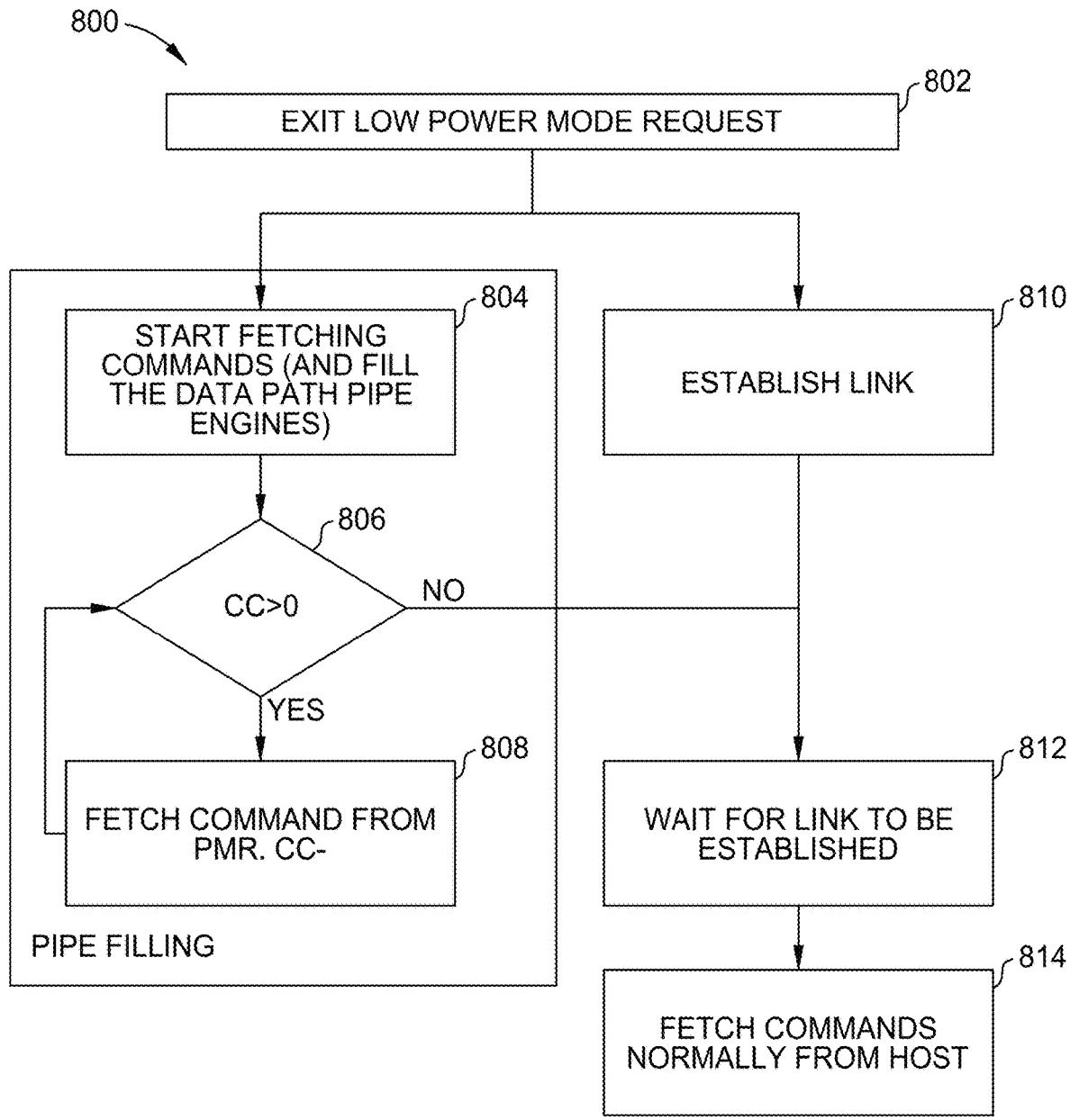
FIG. 8 is a flowchart illustrating exiting low power mode according to one embodiment.

FIG. 8 is a flowchart 800 illustrating exiting low power mode according to one embodiment. In FIG. 8, two sub-flows happen in parallel: pipe-filling and link-establishment. The flow begins at block 802 where there is a request to exit low power mode. In pipe filling, commands are fetched from the PMR at block 804 to fill the data path pipe engines. If the counter is greater than 0 at block 806, then another command is fetched from PMR at block 808 and the counter is reduced. Once the counter is at 0, then the controller waits for the link to be established at block 812. In parallel, the link starts to be established at block 810 before waiting at block 812. After the link is established at block 812, commands can be fetched normally from the host device (i.e., not PMR) at block 814.

The two simple flows of FIGS. 7 and 8 ensure that: residue handling becomes shorter, as there is no execution of commands which are still in the command arrival pipe; and the time it takes to fill the pipes is hidden from the host device as the pipe filling occurs in parallel to establishing the link.

In another embodiment, while entering the low power mode, during the selectively copying, if the "command execution" is in the middle of a long command, the controller can either complete the long command first, or generate a "partial command" which will be smaller in size to reflect the parts that were not executed yet. In that scenario, the partial command will be pushed to the PMR.

Different commands require different amounts of work from the system. Stated another way, commands with an overlap indication will require a lot of FW overhead before actual data transfer (i.e., HW engine pipelines) might be filled. Since the idea here is to fill the pipeline as soon as possible, only "simple" commands will be selected and copied into the PMR during a power down. An example for such commands are short commands. A short command is short enough to be contained in a single indirection-unit (meaning they span in a single NAND page). The commands should not contain any other special attributes like: overlap, being part of a stream, errors, having partial FMUs, short retry timeout, etc.

In another embodiment: L2P tables in low-power mode are not maintained in volatile storage and will take a lot of time until the L2P tables are recovered from the memory device (e.g., NAND). The idea is to prepare the physical addresses for the selected commands before entering low-power state and storing those physical addresses with the selected commands in PMR. Thus, when waking up, the physical address is available and there is no need to wait for the L2P table full recovery.

In another embodiment, the device controller considers the time that has passed since the host device queued the command to make sure the host device will not timeout the command.

By utilizing the PMR to hold previously fetched "simple" commands on power down, and fetching those same commands from PMR at power-up, the time to enter and exit power down mode is reduced. Using the embodiments discussed herein, there is better power entry and exit latencies due to the controller better managing power with less impact to the bandwidth. Thus, the instant disclosure discloses an approach that utilizes the PMR logic and avoids the need for re-fetching.

In one embodiment, a data storage device comprises: a memory device, and a controller coupled to the memory device, wherein the controller is configured to: stop fetching commands from a host device; turn off a link to the host device; selectively copy pre-fetched commands from an arrival queue; store the selectively copied pre-fetched commands in a persistent memory region (PMR), wherein there are two different types of commands, wherein one type of command of the two different types of commands are the pre-fetched commands that are stored in PMR, and wherein a second type of command of the two different types of commands are fetched commands that will not be stored in PMR; determine whether the arrival queue is empty; wait for a data path engine to be idle; and turn off power to the memory device. Each selectively copied pre-fetched command can be contained in a single indirection unit IU. The selectively copied pre-fetched commands do not contain overlap attributes, errors, partial flash memory units (FMUs), retry timeouts below a predetermined threshold, or are part of a stream. The controller is configured to prepare physical addresses for the selectively copied pre-fetched commands. The controller is configured to perform the selective copying by selecting pre-fetched commands that will not timeout. The controller is configured to clean up non pre-fetched commands prior to turning off power. The controller is configured to: determine that at least one command of the pre-fetched commands is currently being executed after being requested to turn off the link but before turning off the link; and determine whether to complete the at least one command or generate a partial command. The controller is configured to generate the partial command and store the partial command in the PMR. The controller is configured to maintain a counter of the selectively copied pre-fetched commands in PMR. The controller is configured to: power on the memory device; start retrieving commands from the PMR; reduce the counter for each retrieval; and reestablish the link with the host device, wherein the reestablishing occurs in parallel to starting retrieving commands from the PMR.

In another embodiment, a data storage device comprises: a memory device; and a controller coupled to the memory device, wherein the controller is configured to: determine whether a persistent memory region (PMR) has any stored commands; start fetching commands from the PMR; reduce a counter for each fetched command; and re-establish a link with a host device, wherein the re-establishing occurs after the determining, wherein there are two different types of commands, wherein one type of command of the two different types of commands are the pre-fetched commands that are stored in PMR, and wherein a second type of command of the two different types of commands are fetched commands that will not be stored in PMR, wherein the re-establishing occurs in parallel to starting fetching commands from the PMR. The re-establishing occurs prior to the reducing. The controller is configured to begin executing the fetched commands prior to fetching new commands from a host device. The controller is configured to stop fetching commands when the counter reaches 0. The controller is configured to fetch commands from the host device after the counter is reduced to 0. The controller comprises a command arrival queue and a command execution module, wherein both the command arrival queue and the command execution module are coupled to the PMR. The PMR has one or more submission queues and wherein the one or more submissions queues are invisible to the host device.

In another embodiment, a data storage device comprises: means to store data; and a controller coupled to the means to store data, wherein the controller is configured to: allocate a first portion of persistent memory region (PMR) to a host device and a second portion of the PMR for storing pre-fetched commands, wherein the second portion is invisible to the host device; store selectively pre-fetched commands in the second portion of the PMR during a power down, wherein there are two different types of commands, wherein one type of command of the two different types of commands are the pre-fetched commands that are stored in PMR, and wherein a second type of command of the two different types of commands are fetched commands that will not be stored in PMR; and retrieve the selectively pre-fetched commands from the second portion of the PMR during a power up. The retrieval occurs in parallel to re-establishing a link between the host device and the data storage device. The controller is configured to continue to execute pre-fetched commands that are not selected, wherein the execution occurs prior to completion of the power down.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller is configured to:
        stop fetching commands from a host device;
        turn off a link to the host device;
        selectively copy pre-fetched commands from an arrival queue;
        store the selectively copied pre-fetched commands in a persistent memory region (PMR), wherein there are two different types of commands, wherein one type of command of the two different types of commands are the pre-fetched commands that are stored in PMR, and wherein a second type of command of the two different types of commands are fetched commands that will not be stored in PMR;
        determine whether the arrival queue is empty;
        wait for a data path engine to be idle; and
        turn off power to the memory device.

2. The data storage device of claim 1, wherein each selectively copied pre-fetched command can be contained in a single indirection unit IU.

3. The data storage device of claim 1, wherein the selectively copied pre-fetched commands do not contain overlap attributes, errors, partial flash memory units (FMUs), retry timeouts below a predetermined threshold, or are part of a stream.

4. The data storage device of claim 1, wherein the controller is configured to prepare physical addresses for the selectively copied pre-fetched commands.

5. The data storage device of claim 1, wherein the controller is configured to perform the selective copying by selecting pre-fetched commands that will not timeout.

6. The data storage device of claim 1, wherein the controller is configured to clean up non pre-fetched commands prior to turning off power.

7. The data storage device of claim 1, wherein the controller is configured to:
    determine that at least one command of the pre-fetched commands is currently being executed after being requested to turn off the link but before turning off the link; and
    determine whether to complete the at least one command or generate a partial command.

8. The data storage device of claim 7, wherein the controller is configured to generate the partial command and store the partial command in the PMR.

9. The data storage device of claim 1, wherein the controller is configured to maintain a counter of the selectively copied pre-fetched commands in PMR.

10. The data storage device of claim 9, wherein the controller is configured to:
    power on the memory device;
    start retrieving commands from the PMR;
    reduce the counter for each retrieval; and
    reestablish the link with the host device, wherein the reestablishing occurs in parallel to starting retrieving commands from the PMR.

11. A data storage device, comprising:
    a memory device; and
    a controller coupled to the memory device, wherein the controller is configured to:
        determine whether a persistent memory region (PMR) has any stored commands;
        start fetching commands from the PMR;
        reduce a counter for each fetched command; and
        re-establish a link with a host device, wherein the re-establishing occurs after the determining, wherein there are two different types of commands, wherein one type of command of the two different types of commands are the pre-fetched commands that are stored in PMR, and wherein a second type of command of the two different types of commands are fetched commands that will not be stored in PMR, wherein the re-establishing occurs in parallel to starting fetching commands from the PMR.

12. The data storage device of claim 11, wherein the re-establishing occurs prior to the reducing.

13. The data storage device of claim 11, wherein the controller is configured to begin executing the fetched commands prior to fetching new commands from a host device.

14. The data storage device of claim 11, wherein the controller is configured to stop fetching commands when the counter reaches 0.

15. The data storage device of claim 11, wherein the controller is configured to fetch commands from the host device after the counter is reduced to 0.

16. The data storage device of claim 11, wherein the controller comprises a command arrival queue and a command execution module, wherein both the command arrival queue and the command execution module are coupled to the PMR.

17. The data storage device of claim 11, wherein the PMR has one or more submission queues and wherein the one or more submissions queues are invisible to the host device.

18. A data storage device, comprising:
    means to store data; and
    a controller coupled to the means to store data, wherein the controller is configured to:

allocate a first portion of persistent memory region (PMR) to a host device and a second portion of the PMR for storing pre-fetched commands, wherein the second portion is invisible to the host device;

store selectively pre-fetched commands in the second portion of the PMR during a power down, wherein there are two different types of commands, wherein one type of command of the two different types of commands are the pre-fetched commands that are stored in PMR, and wherein a second type of command of the two different types of commands are fetched commands that will not be stored in PMR; and retrieve the selectively pre-fetched commands from the second portion of the PMR during a power up.

19. The data storage device of claim 18, wherein the retrieval occurs in parallel to re-establishing a link between the host device and the data storage device.

20. The data storage device of claim 18, wherein the controller is configured to continue to execute pre-fetched commands that are not selected, wherein the execution occurs prior to completion of the power down.

* * * * *